(12) United States Patent
Yin

(10) Patent No.: US 9,191,354 B2
(45) Date of Patent: Nov. 17, 2015

(54) MAINTAINING AND UPDATING NOTIFICATION REGISTRATION INFORMATION

(71) Applicant: Verizon Patent and Licensing Inc., Basking Ridge, NJ (US)

(72) Inventor: Fenglin Yin, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 288 days.

(21) Appl. No.: 14/015,059

(22) Filed: Aug. 30, 2013

(65) Prior Publication Data

US 2015/0067072 A1    Mar. 5, 2015

(51) Int. Cl.
*G06F 15/16* (2006.01)
*H04L 12/58* (2006.01)

(52) U.S. Cl.
CPC .............. *H04L 51/30* (2013.01); *H04L 51/24* (2013.01)

(58) Field of Classification Search
CPC ............................... H04L 51/24; H04L 51/30
See application file for complete search history.

(56) References Cited

U.S. PATENT DOCUMENTS

| 9,088,622 | B2 * | 7/2015 | Erbe | 1/1 |
| 2004/0006747 | A1 * | 1/2004 | Tyler | 715/530 |
| 2006/0047666 | A1 * | 3/2006 | Bedi et al. | 707/10 |
| 2011/0270763 | A1 * | 11/2011 | Graham et al. | 705/71 |
| 2014/0012997 | A1 * | 1/2014 | Erbe | 709/228 |

* cited by examiner

*Primary Examiner* — Moustafa M Meky
*Assistant Examiner* — Sm Z Islam

(57) ABSTRACT

A first server may receive, from a user device, a first instruction including a token and a request to register the user device to receive a message associated with a particular application; update registration information to indicate that the user device is to receive the message based on receiving the first instruction; and provide a second instruction to a second server to cause the second server to provide the message to the user device on behalf of the first server. The second instruction may include information regarding the message, the token, and an instruction to provide the message to the user device associated with the token. The first server may receive, from the second server, a report indicating that the message was not delivered to the user device; and update the registration information to indicate that the user device is no longer to receive the message based on receiving the report.

20 Claims, 8 Drawing Sheets

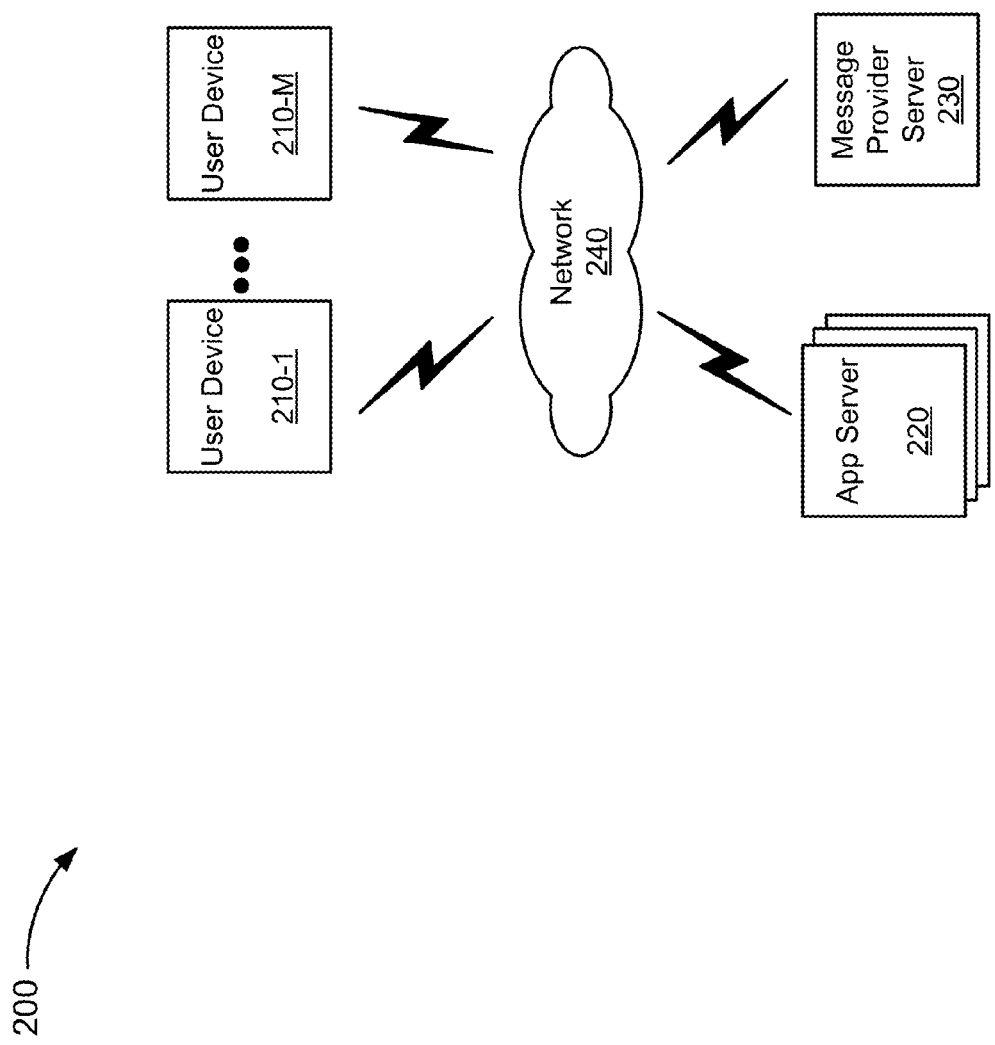

MAINTAINING AND UPDATING NOTIFICATION REGISTRATION INFORMATION

BACKGROUND

Users can use user devices to receive messages associated with an application (e.g., a content delivery application that provides audio content, video content, etc.). An application server can provide a message (e.g., on behalf of a message provider) to the user device when the application is running in the background to save battery power on the user device (e.g., the application server can "push" the message to the user device). The application server may provide (e.g., "push") the message to the user device when a user subscribes to receive messages from the application server. The application server sometimes provides messages after the application has been uninstalled or when the user has unsubscribed to receive the messages. That is, the application server sometimes provides messages that go undelivered, thereby wasting network resources when providing messages that go undelivered.

BRIEF DESCRIPTION OF THE DRAWINGS

FIG. 2 illustrates an example environment in which systems and/or methods, described herein, may be implemented;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a message provider server with information identifying user devices that are to receive messages associated with a particular application (e.g. messages in the form of "push" notifications that are provided to a user device without the user device requesting the messages and while the particular application is running on the user device). In some implementations, the message provider server may receive an error report that identifies user devices that are no longer to receive the messages. In some implementations, the message provider server may receive the error report and may update registration information that identifies particular user devices that are no longer to receive the messages (e.g., when a user unsubscribes from receiving the messages and/or when an application, associated with the messages, has been uninstalled on a user device). As a result, the message provider server may avoid providing messages that may go undelivered (e.g., when the application has been uninstalled or when a user has unsubscribed from receiving the messages), thereby freeing up network resources that would have been used to deliver the messages.

Figure 1A:
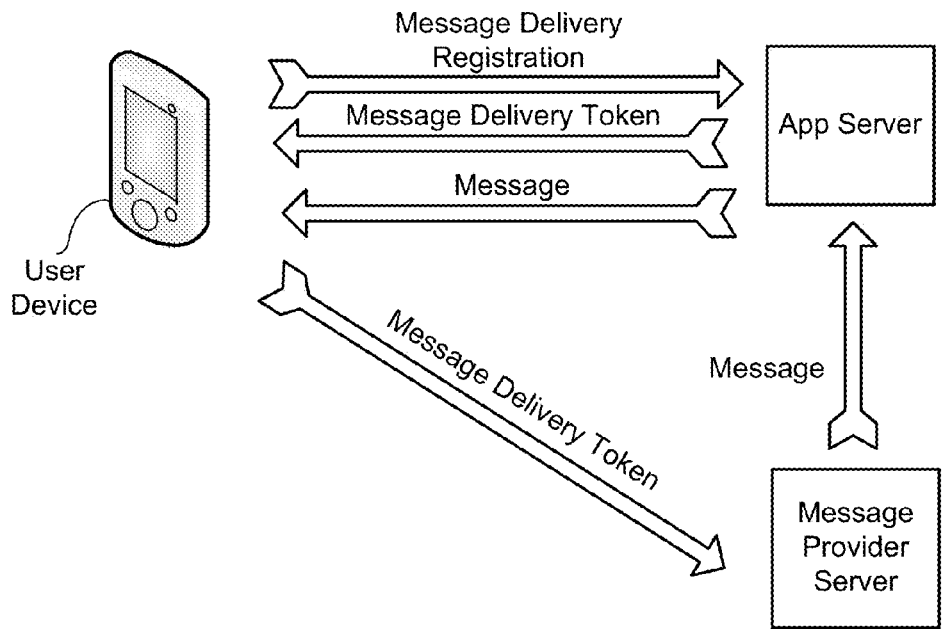
FIGS. 1A-1B illustrate example overviews of an implementation described herein.
Figure 1B:
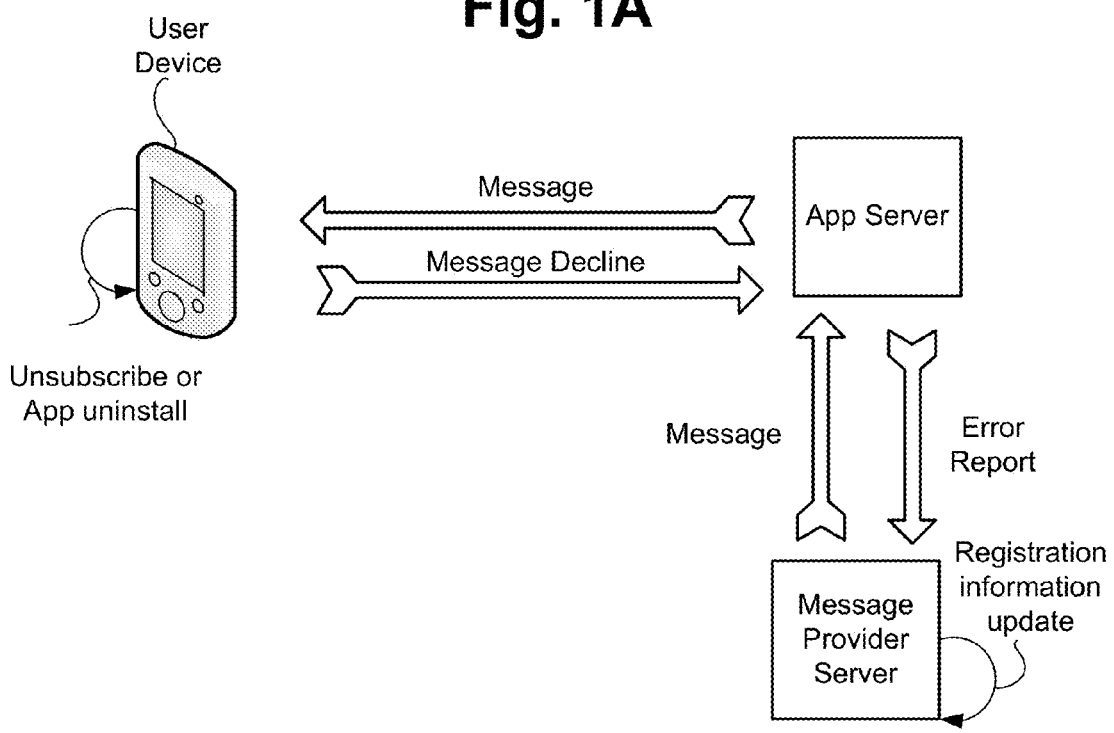

FIGS. 1A-1B illustrate an example overview of an implementation described herein. In some implementations, a user device may communicate with an application server (hereinafter referred to as an "app server") to transmit/receive data associated with an application. For example, the user device may communicate with a particular app server, associated with a content delivery application, to transmit/receive data associated with receiving content, updating content delivery account information, etc.

As shown in FIG. 1A, a user device may provide a message delivery registration instruction to the app server. In some implementations, the message delivery registration instruction may correspond to a subscription request, received from a user of the user device, to receive messages associated with an application (e.g., messages in the form of "push" notifications). For example, the subscription request may include a request to receive messages corresponding to promotions for content delivery associated with a content delivery application.

In some implementations, the app server may provide a message delivery token to the user device based on receiving the message delivery registration instruction. In some implementations, the user device may provide the message delivery token to a message provider server (e.g., a server associated with a service provider network, such as a cellular network, that provides network connectivity to the user device). In some implementations, the message provider server may store information, identifying that the user device has subscribed to receive messages associated with the application. In some implementations, the message provider server may provide a message, associated with the application, towards the user device and via the app server. In some implementations, the app server may provide the message to the user device as a push notification.

In some implementations, the user device may uninstall the application or receive an unsubscribe request (e.g., a request to unsubscribe from receiving messages associated with the application). Referring to FIG. 1B, the user device may provide a message decline indication to the app server when the user device receives a message after uninstalling the application or receiving the unsubscribe request. In some implementations, the app server may store information identifying that the message was undelivered (e.g., in an error report). In some implementations, the app server may provide the error report to the message provider server such that the message provider server may update registration information to reflect that the user device is no longer to receive messages associated with the application. As a result, the message provider server may not send subsequent messages to the user device, thereby reducing network load.

As used herein, the term "message" may correspond to the term "notification" and may be used interchangeable with the term "notification."

FIG. 2 is a diagram of an example environment 200 in which systems and/or methods described herein may be implemented. As shown in FIG. 2, environment 200 may include user devices 210-1, . . . , 210-M (where M≥1), app server 220, message provider server 230, and network 240.

User device 210 may include any device capable of communicating via a network, such as network 240. For example, user device 210 may correspond to a mobile communication device (e.g., a smart phone or a personal digital assistant (PDA)), a portable computer device (e.g., a laptop or a tablet computer), a gaming device, a set-top box, a desktop computer, or another type of device. In some implementations, user device 210 may communicate with app server 220 to download an application, receive a message associated with the application, and transmit/receive data flows in connection with performing a task via the application (e.g., transmit/ receive data flows in connection with receiving content from a content delivery provider, managing account information for a service, communicating via a gaming application, a social media application, or the like).

App server 220 may include one or more computing devices, such as a server device or a collection of server devices. In some implementations, app server 220 may store an application (e.g., a content delivery application, a gaming application, and/or some other type of application) that user device 210 may receive to perform a task (e.g., receive content, play a game, control a remote device, etc.). For example, as described above, app server 220 may transmit/receive data flows in connection with allowing user device 210 to perform the task.

In some implementations, app server 220 may provide a message (e.g., as a "push" notification), associated with a particular application, to user device 210. For example, for a content delivery application, app server 220 may provide a message for a promotion on discounted pricing for content delivery. For a gaming application, app server 220 may provide a message relating to a promotion on discounted pricing for virtual goods, a message advising a user of user device 210 regarding a status of the game, and/or some other type of message relating to the gaming application. For another application, app server 220 may provide another message to user device 210 associated with the application.

In some implementations, a particular app server 220 may be associated with applications of a particular operating system or platform of user device 210. For example, a first app server 220 may be associated with user devices 210 running on a first operating system, a second app server 220 may be associated with user devices 210 running on a second operating system, and so on.

Message provider server 230 may include one or more computing devices, such as a server device or a collection of server devices. In some implementations, message provider server 230 may store messages that are to be provided to user device 210 via app server 220. For example, message provider server 230 may include a message queue having one or more messages that are to be provided to particular user devices 210 (e.g., user devices 210 of a particular model, running a particular operating system, etc.) that are to receive the messages associated with an application. In some implementations, message provider server 230 may maintain registration information that identifies user devices 210 that are to receive messages. For example, message provider server 230 may store information identifying that a particular user device 210 is to receive messages for a particular application (e.g., when receiving a notification token from the particular user device 210). Further, message provider server 230 may remove the information identifying that the particular user device 210 is to receive messages for the particular application when the application is uninstalled from the particular user device 210 and/or when a user of the particular user device 210 unsubscribes from receiving the messages (e.g., based on information included in a message error report).

In some implementations, app server 220 and message provider server 230 may be associated with different parties. For example, message provider server 230 may be associated with a service provider network (e.g., a cellular network), that provides connectivity between user device 210 and network 240, whereas app server 220 may be associated with a developer of applications and/or a service provider that provides services to user device 210 via the applications (e.g., content delivery services, gaming services, payment delivery services, etc.).

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
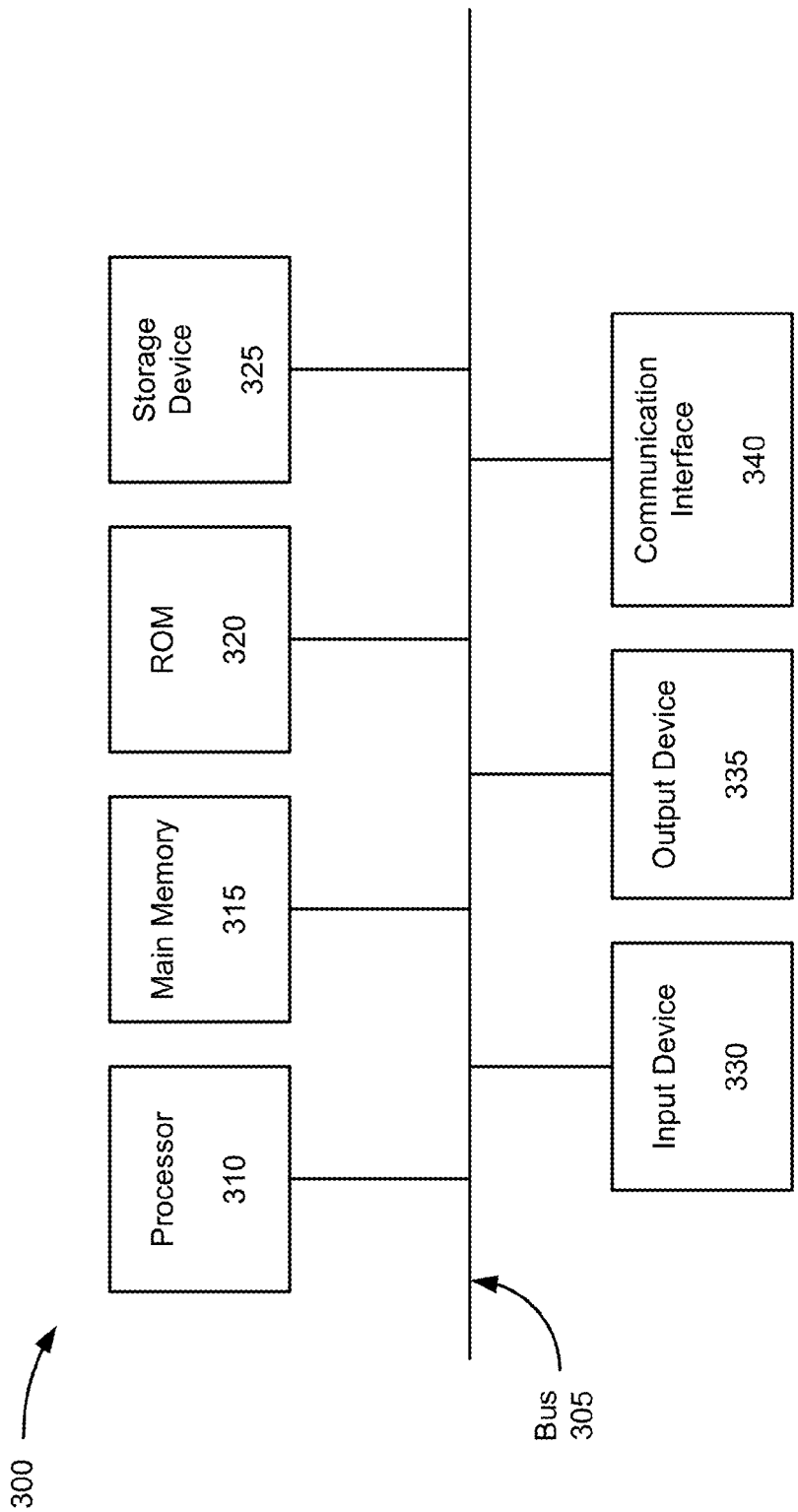
FIG. 3 illustrates example components of a device that may be used within the environment of FIG. 2.

FIG. 3 illustrates example components of a device 300 that may be used within environment 200 of FIG. 2. Device 300 may correspond to user device 210, app server 220, and/or message provider server 230. Each of user device 210, app server 220, and/or message provider server 230 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
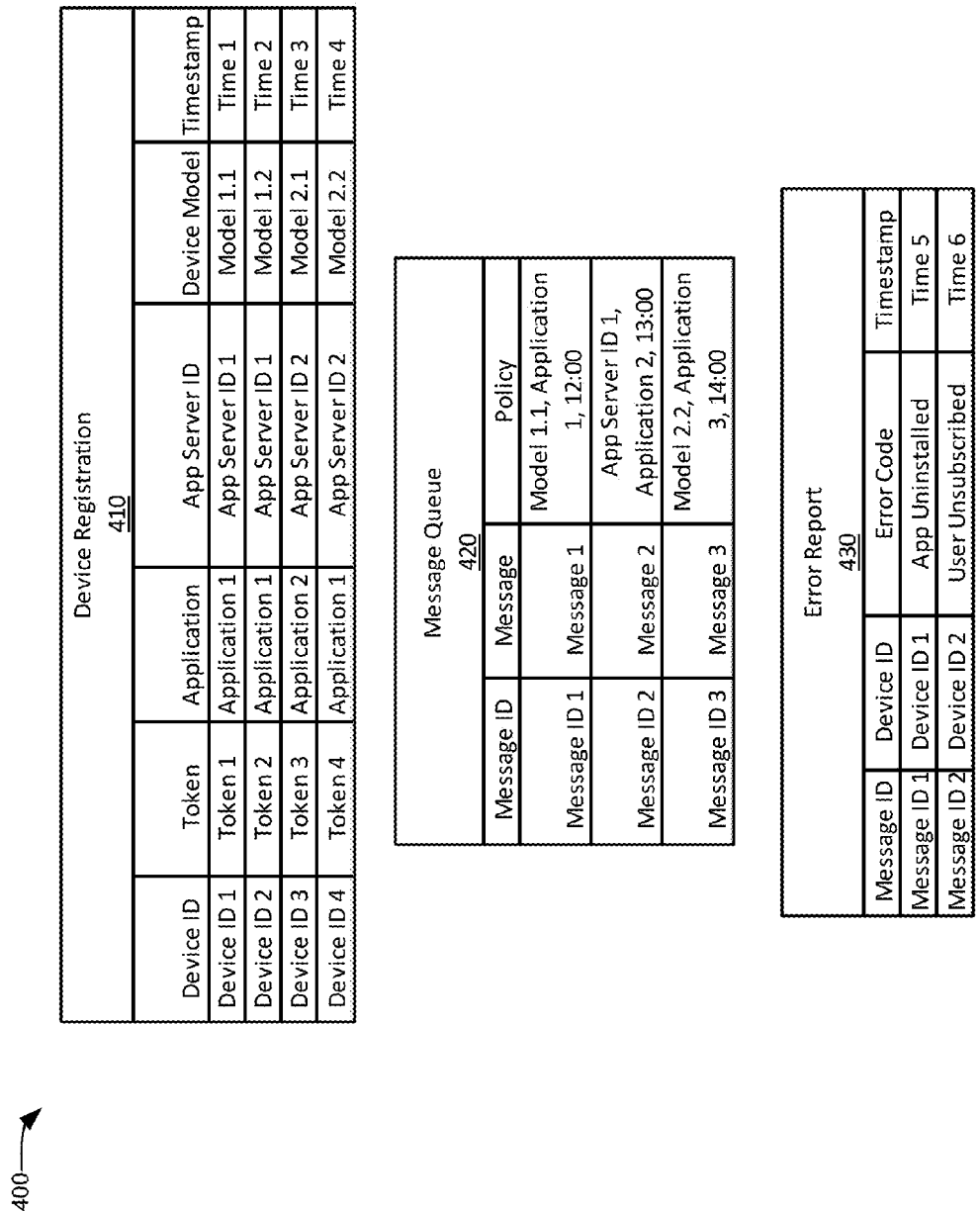
FIG. 4 illustrates an example data structure that may be stored by one or more devices in the environment of FIG. 2.

FIG. 4 illustrates an example data structure 400 that may be stored by one or more devices in environment 200, such as app server 220 and/or message provider server 230. In some implementations, data structure 400 may be stored in a memory of app server 220 and/or message provider server 230. In some implementations, data structure 400 may be stored in a memory separate from, but accessible by, app server 220 and/or message provider server 230. In some implementations, data structure 400 may be stored by some other device in environment 200, such as user device 210. A particular instance of data structure 400 may contain different information and/or fields than another instance of data structure 400.

As shown in FIG. 4, data structure 400 may include device registration field 410, message queue field 420, and error report field 430.

Device registration field 410 may store information identifying user devices 210 that have registered to receive messages associated with a particular application. For example, as described above, user device 210 may provide a message delivery registration instruction to app server 220 and may receive a message delivery token (hereinafter referred to as a "token") from app server 220. In some implementations, user device 210 may provide the token to message provider server 230 to register to receive messages.

As shown in FIG. 4, device registration field 410 may store an identifier (ID) of a user device 210 (e.g., a subscriber identity module (SIM) card number, a universal integrated circuit card (UICC) ID, a telephone number, a network address, and/or some other type of device ID of user device 210) that has registered to receive messages (e.g., based on providing a token, received from app server 220, to message provider server 230). In some implementations, device registration field 410 may store the token corresponding to user device 210. In some implementations, the token may be in the format of an 8 octet string or have some other format.

In some implementations, device registration field 410 may store information identifying an application corresponding to the token and associated with messages that are to be received by user device 210. In some implementations, device registration field 410 may store an ID of a particular app server 220 associated with user device 210. For example, as described above, a particular app server 220 may correspond to a platform or operating system running on user device 210. In some implementations, device registration field 410 may store information identifying a model of user device 210 (e.g., a model number, a serial number prefix, a model version number, etc.). In some implementations, the app server ID and the device model may be associated with the device ID. In some implementations, device registration field 410 may store a timestamp corresponding to when user device 210 provided the token to register to receive messages.

Message queue field 420 may store a list of messages that are to be provided to a particular group of user devices 210. For example, message queue field 420 may store a message ID to uniquely identify a particular message to be provided. In some implementations, the message ID may be in the form of an 8 octet string or some other format. In some implementations, message queue field 420 may store a message corresponding to the message ID. In some implementations, the message may be in the form of a 256 octet string, a computer file, a web address, a server address, a pointer to the message (which may be stored in another data structure) or the like.

In some implementations, message queue field 420 may store policy information for a corresponding message. In some implementations, the policy information may identify a particular group of user devices 210 that are to receive a particular message. For example, the policy information may identify that user devices 210 of a particular model that have registered to receive messages associated with a particular application are to receive a particular message at a particular time.

As an example shown in FIG. 4, user devices 210 having the model number "model 1.1" that are to receive messages associated with "application 1," may receive the message corresponding to message ID 1 at 12:00.

As another example, user devices 210 associated with the app server 220 having the ID "app server ID 1," that are to receive messages associated with "application 2," may receive the message corresponding to message ID 2 at 13:00. That is, user devices 210 that are of a particular platform (e.g., corresponding to the app server 220 having the ID "app server ID 1") may receive message ID 2.

As described in greater detail below, message provider server 230 may identify tokens of user devices 210 having attributes corresponding to policy information for a message and may direct app server 220 to provide a message to the user devices 210 corresponding to the tokens.

Error report field 430 may store information identifying messages that were undelivered to particular user devices 210 identified by a particular device ID. For example, as described above, app server 220 may receive a message decline indication from user device 210 when app server 220 provides a message that user device 210 may not receive (e.g., when an application, corresponding to the message, has been uninstalled, and/or when a user of user device 210 has unsubscribed from receiving the messages). In some implementations, error report field 430 may store an error code that identifies a reason for why a message was undelivered. In some implementations, error report field 430 may store a timestamp identifying a time at which the message was undelivered. As described in greater detail below, message provider server 230 may remove a device ID and corresponding information from device registration field 410 based on information included in error report field 430.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
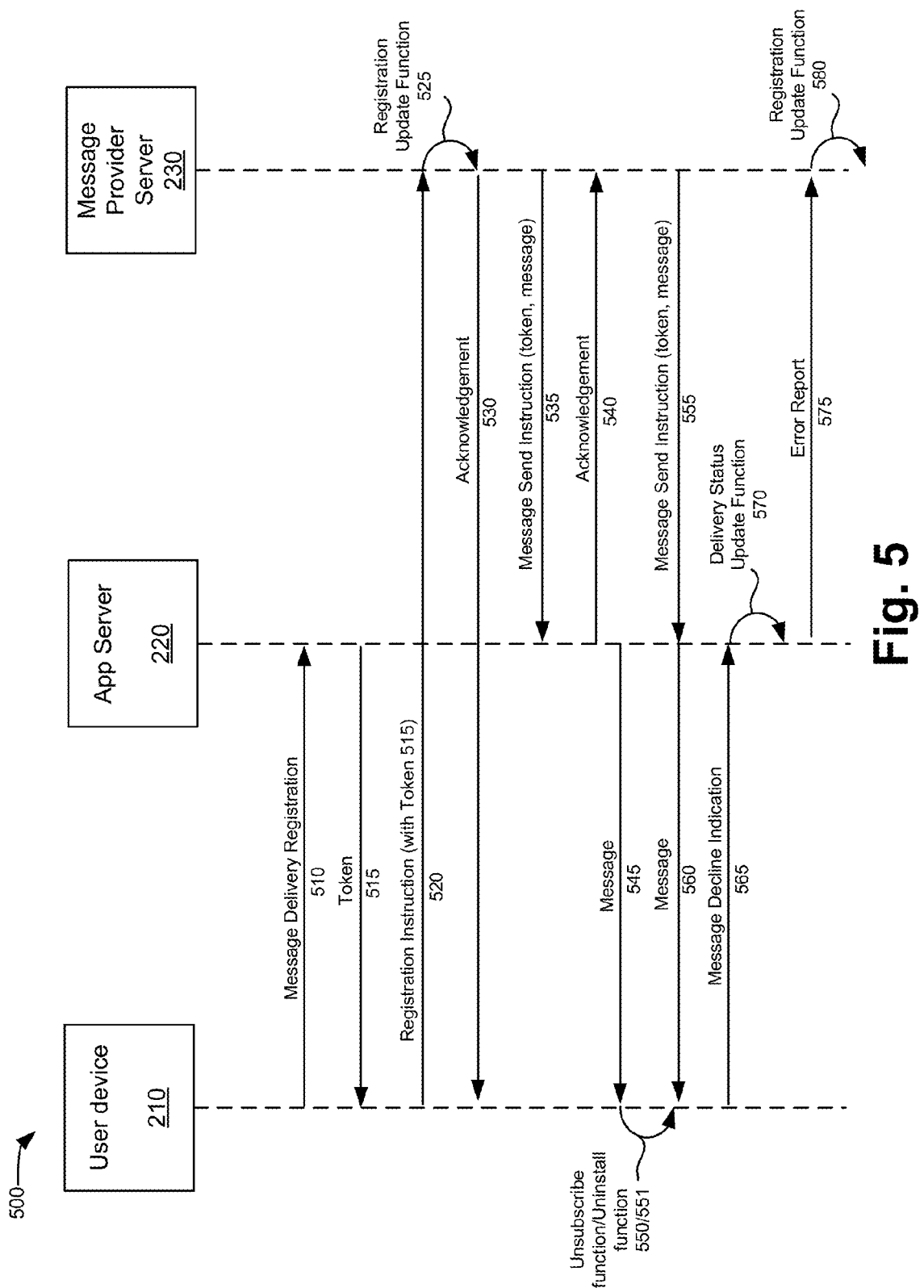
FIG. 5 illustrates a call flow diagram of example operations capable of being performed by an example portion of the environment of FIG. 2.

FIG. 5 illustrates a call flow diagram of example operations capable of being performed by an example portion 500 of environment 200. As shown in FIG. 5, portion 500 may include user device 210, app server 220, and/or message provider server 230. User device 210, app server 220, and/or message provider server 230 may include components and/or perform functions described above in connection with, for example, one or more of FIGS. 1-4. FIG. 5 may correspond to example operations to provide a message to user device 210 (e.g., a "push" notification associated with an application) and to maintain message registration information.

In some implementations, user device 210 may provide message delivery registration 510 to app server 220. For example, user device 210 may provide message delivery registration 510 based on receiving an instruction from a user of user device 210 to subscribe to receive messages associated with a particular application. In some implementations, message delivery registration 510 may include a request to receive messages associated with the particular application, an application ID of the particular application, an ID of a developing party associated with the application, a device ID of user device 210, and/or some other information regarding user device 210 (e.g., a model number, an operating system version, and/or some other information that may be based on the device ID).

In some implementations, app server 220 may generate token 515 based on receiving message delivery registration 510 and may provide token 515 to user device 210. In some implementations, app server 220 may store information mapping token 515 to the device ID of user device 210.

In some implementations, user device 210 may provide registration instruction 520 to message provider server 230 based on receiving token 515. In some implementations, registration instruction 520 may include token 515, the application ID of the particular application, the device ID of user device 210, and/or some other information regarding user device 210 (e.g., a model number, an operating system version, and/or some other information that may be based on the device ID). In some implementations, registration instruction 520 may also include a request to register user device 210 to receive messages associated with the particular application.

In some implementations, message provider server 230 may perform registration update function 525 (e.g., to register user device 210 to receive messages associated with the particular application) based on receiving registration instruction 520. For example, message provider server 230 may authenticate token 515 (e.g., using a hash-based message authentication code (HMAC) technique and/or some other type of authentication technique) to identify that token 515 originated from user device 210 and did not originate from an unauthorized device. In some implementations (e.g., based on authenticating the token), message provider server 230 may store the device ID of user device 210, token 515, the application ID of the particular application, an ID of app server 220 associated with user device 210 (e.g., based on an operating system of user device 210 corresponding to the device ID), information identifying the model of user device 210, and/or some other information regarding user device 210 in device registration field 410. In some implementations, message provider server 230 may provide acknowledgement 530 based on performing registration update function 525 to indicate that user device 210 has been registered to receive messages associated with the particular application. In some implementations, user device 210 may resend registration instruction 520 if acknowledgement 530 has not been received within a particular amount of time of sending registration instruction 520.

In some implementations, app server 220 may periodically refresh token 515 (e.g., based on a security protocol to refresh token 515). In some implementations, user device 210 may provide registration instruction 520 based on receiving a refreshed token 515. In some implementations, message provider server 230 may perform registration update function 525 based on receiving registration instruction 520 having a refreshed token 515 such that message provider server 230 may update token 515 in device registration field 410.

In some implementations, an operator of message provider server 230 may store a message in message queue field 420 for a message that is to be provided to user device 210. For example, the operator may store a message ID, corresponding to the message, and a policy that identifies an application, associated with the message, a time at which to send the message, and particular user devices 210 to which to provide the message based on attributes of user device 210. As described above, the policy may identify that user devices 210, registered to receive messages associated with the application, and associated with a particular model number, operating system (e.g., corresponding to a particular app server 220), or other attribute, may receive a message associated with the application. In some implementations, message provider server 230 may identify tokens of those user devices 210 that are to receive the message.

As an example, assume message queue field 420 stores a policy for message ID 1 that indicates that user devices 210, associated with model 1.1 and subscribed to receive messages for application ID 1, are to receive message ID 1. Given this assumption, message provider server 230 may identify the tokens of those user devices 210 that are associated with model 1.1 and subscribed to receive messages for application ID 1 based on information stored by device registration field 410. Assume that the identified tokens include a token associated with the user device 210 in FIG. 5.

In some implementations, message provider server 230 may provide message send instruction 535 at a time in accordance with a policy stored by message queue field 420 and based on determining the tokens as described above. In some implementations, message send instruction 535 may include the identified tokens and a message that is to be sent to user devices 210 associated with the tokens. In some implementations, app server 220 may receive message send instruction 535 and may provide acknowledgement 540 to indicate that message send instruction 535 has been received. In some implementations, message provider server 230 may resend message send instruction 535 if acknowledgement 540 has not been received within a particular period of time of sending message send instruction 535.

In some implementations, app server 220 may identify user devices 210 corresponding to the tokens included in message send instruction 535 (e.g., based on information stored by device registration field 410) and may provide message 545 (e.g., the message included in message send instruction 535) to user device 210. As a result, user device 210 may receive the message, associated with a particular application, as a push notification, thereby receiving the notification without the need to login to the application and while allowing the application to run in a background status to preserve battery power on user device 210.

As further shown in FIG. 5, user device 210 may perform unsubscribe function 550 (e.g., based on receiving an instruction from a user of user device 210 to unsubscribe from receiving messages for the application). In some implementations, user device 210 may perform uninstall function 551 (e.g., based on receiving an instruction from the user to uninstall the application). In some implementations, message provider server 230 may provide message send instruction 555 including a token associated with user device 210 (e.g., after user device 210 has performed unsubscribe function 550 and/or uninstall function 551).

At some later time, app server 220 may provide message 560 (corresponding to the message associated with message send instruction 555) to user device 210. In some implementations, user device 210 may provide message decline indication 565 based on receiving message 560. For example, user device 210 may provide message decline indication 565 since user device 210 has been unsubscribed from receiving the messages and/or the application has been uninstalled. In some implementations, message decline indication 565 may include an error code identifying that message 560 is undeliverable as a result of the application having been uninstalled, the user having unsubscribed from receiving messages, and/or of some other factor that indicates that message provider server 230 is to remove information identifying user device 210 from device registration field 410. In some implementations, user device 210 may discard message 560 based on user device 210 having been unsubscribed and/or having uninstalled the application.

In some implementations, app server 220 may perform delivery status update function 570 and may store information (e.g., in error report field 430) that identifies that message 560 was undeliverable. In some implementations, delivery status update function 570 may include an ID of message 560, a device ID of user device 210, an error code included in message decline indication 565, a timestamp identifying a time at which message decline indication 565 was received, and/or some other information regarding message 560.

In some implementations, app server 220 may provide error report 575 to message provider server 230. For example, app server 220 may provide error report 575 based on receiving message decline indication 565 and performing delivery status update function 570. Additionally, or alternatively, app server 220 may periodically provide error report 575 at regular intervals (e.g., once a day, once every other day, and/or some other interval). Additionally, or alternatively, app server 220 may provide error report 575 based on receiving a request from message provider server 230 to provide error report 575. In some implementations, information stored by error report 575 may correspond to information stored by error report field 430.

In some implementations, message provider server 230 may perform registration update function 580 based on receiving error report 575. In some implementations, message provider server 230 may remove registration information from device registration field 410 that identifies that user device 210 is to receive a message associated with an application. For example, based on message information included in error report 575, message provider server 230 may identify the device ID of user device 210, a message ID for message 560, and an application corresponding to the message ID based on policy information stored by message queue field 420. In some implementations, message provider server 230 may remove a token and corresponding information from device registration field 410 to unsubscribe user device 210 from receiving messages associated with the application. In some implementations, message provider server 230 may retain registration information to allow user device 210 to receive messages associated with another application.

While a particular series of operations and/or data flows have been described above with regards to FIG. 5, the order of the operations and/or data flows may be modified in other implementations. Further, non-dependent operations may be performed in parallel.

Figure 6:
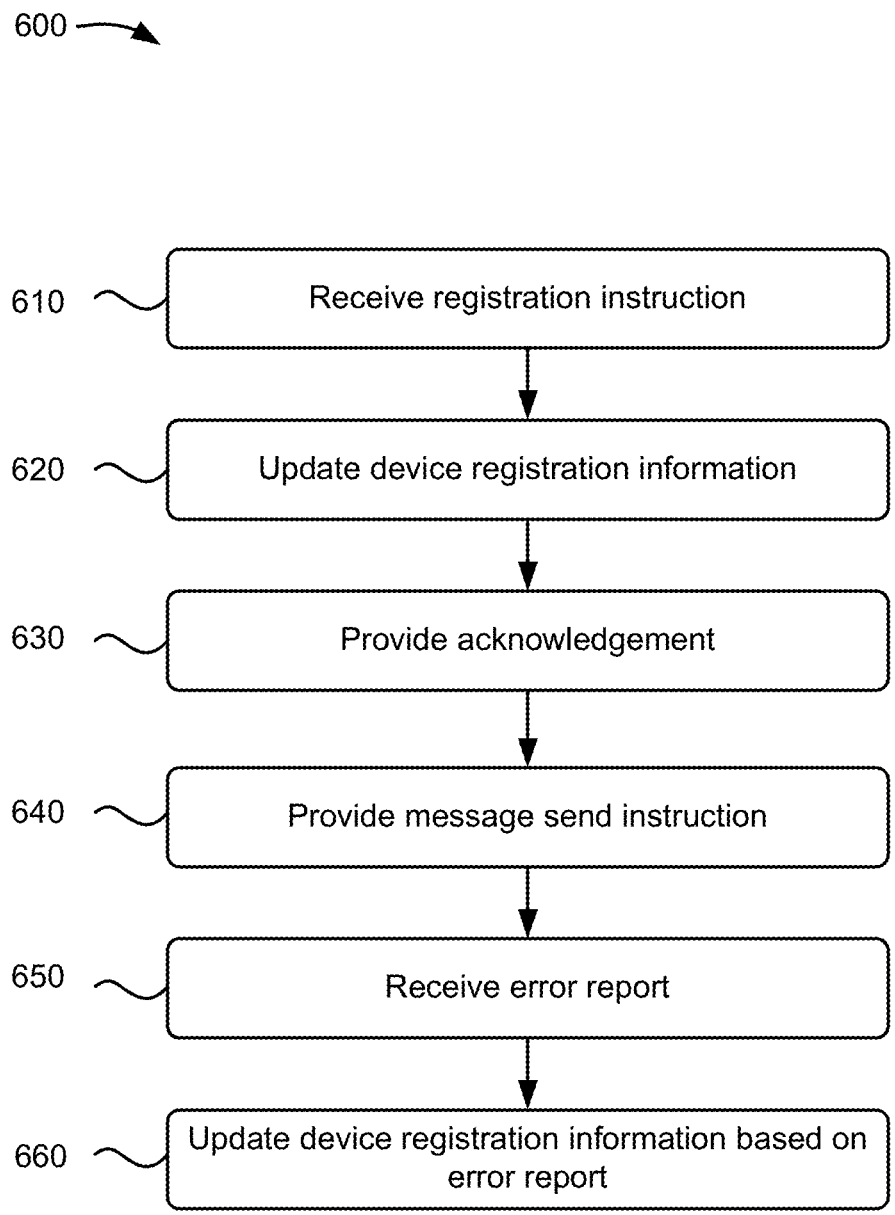
FIG. 6 illustrates a flowchart of an example process for updating device registration information based on an error report.

FIG. 6 illustrates a flowchart of an example process for updating device registration information based on an error report. In some implementations, process 600 may be performed by one or more components of message provider server 230. In some implementations, some or all of blocks of process 600 may be performed by one or more components of another device in environment 200 (e.g., app server 220 and/or user device 210), or a group of devices including or excluding message provider server 230.

As shown in FIG. 6, process 600 may include receiving a registration instruction (block 610). For example, as described above with respect to registration instruction 520, message provider server 230 may receive registration instruction 520 to register user device 210 to receive messages (e.g., as "push" notifications) associated with an application. In some implementations, registration instruction 520 may include token 515, the application ID of the application, the device ID of user device 210, and/or some other information regarding user device 210.

Process 600 may also include updating device registration information (block 620). For example, as described above with respect to registration update function 525, message provider server 230 may authenticate token and may store the device ID of user device 210, token 515, the application ID of the particular application, an ID of app server 220 associated with user device 210 (e.g., based on an operating system of user device 210 corresponding to the device ID), information identifying the model of user device 210, and/or some other information regarding user device 210 in device registration field 410. In some implementations, blocks 610 and 620 may be repeated each time user device 210 receives refreshed tokens from app server 220.

Process 600 may further include providing an acknowledgment (block 630). For example, as described above with respect to acknowledgement 530, message provider server 230 may provide acknowledgement 530 based on performing registration update function 525 to indicate that message provider server 230 has been registered to receive messages associated with the particular application. In some implementations, user device 210 may resend registration instruction 520 if acknowledgement 530 has not been received within a particular amount of time.

Process 600 may also include providing a message send instruction (block 640). For example, message provider server 230 may provide message send instruction 535 (e.g., to provide a message associated with an application) at a time in accordance with a policy stored by message queue field 420 and based on determining tokens corresponding to user devices 210 that are to receive the message. In some implementations, message send instruction 535 may include the identified tokens and the message that is to be sent to user devices 210 associated with the tokens. In some implementations, app server 220 may receive message send instruction 535 and may obtain and provide the message to user devices 210 associated with the tokens.

Process 600 may further include receiving an error report (block 650). For example, as described above with respect to error report 575, message provider server 230 may receive error report 575 from app server 220. In some implementations, app server 220 may provide error report 575 based on receiving message decline indication 565 and performing delivery status update function 570. Additionally, or alternatively, app server 220 may periodically provide error report 575 at regular intervals (e.g., once a day, once every other day, and/or some other interval). Additionally, or alternatively, app server 220 may provide error report 575 based on receiving a request from message provider server 230 to provide error report 575. In some implementations, information stored by error report 575 may correspond to information stored by error report field 430.

Process 600 may also include updating device registration information based on the error report (block 660). For example, as described above with respect to registration update function 580, message provider server 230 may remove registration information from device registration field 410 that identifies that user device 210 is to receive a message associated with an application. For example, based on message information included in error report 575, message provider server 230 may identify the device ID of user device 210, a message ID for message 560, and an application corresponding to the message ID based on policy information stored by message queue field 420. In some implementations, message provider server 230 may remove a token and corresponding information from device registration field 410 to unsubscribe user device 210 from receiving messages associated with the application. In some implementations, message provider server 230 may retain some of the registration information to allow user device 210 to receive messages associated with another application.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7A:
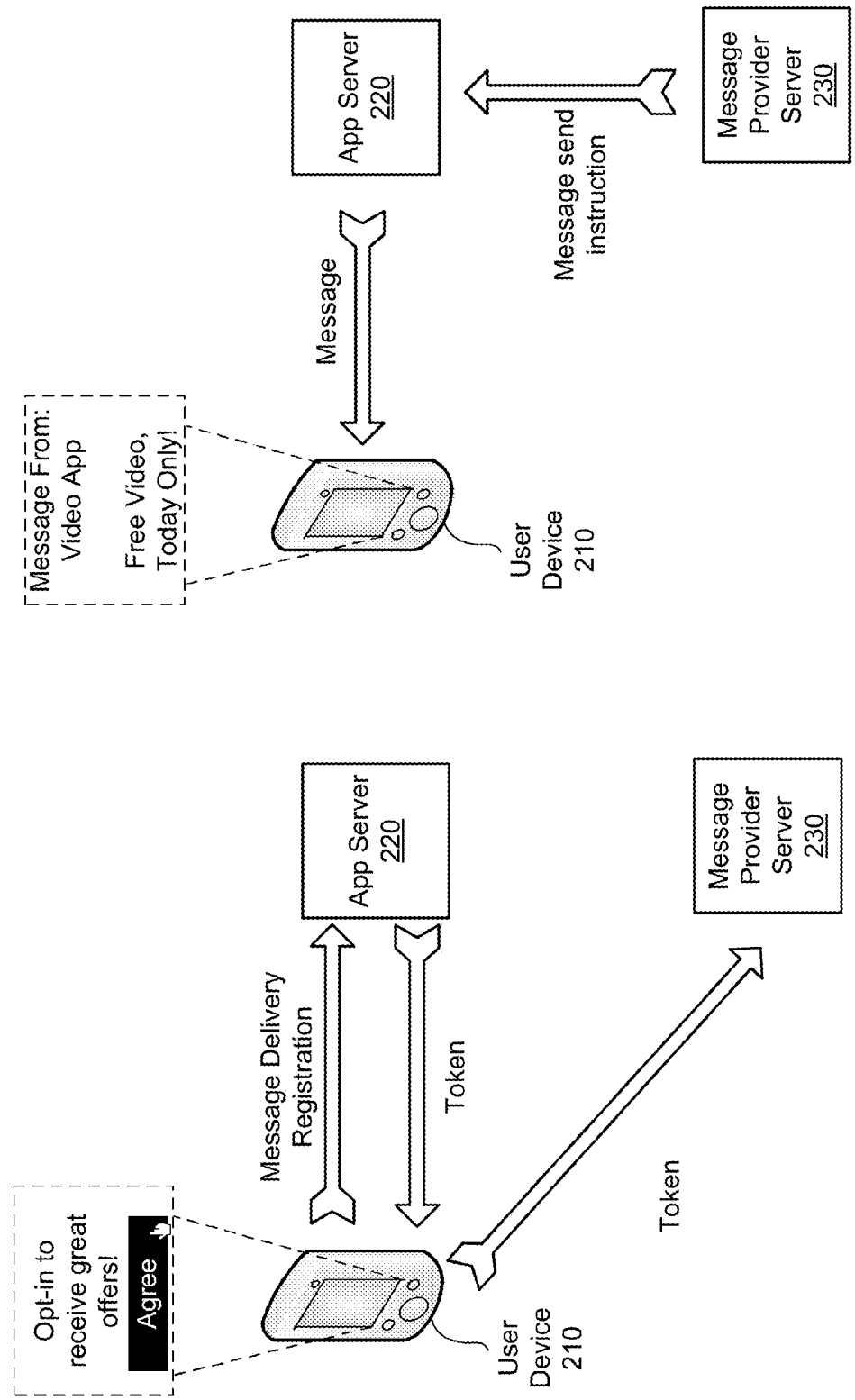
FIGS. 7A-7B illustrate example implementations as described herein.
Figure 7B:
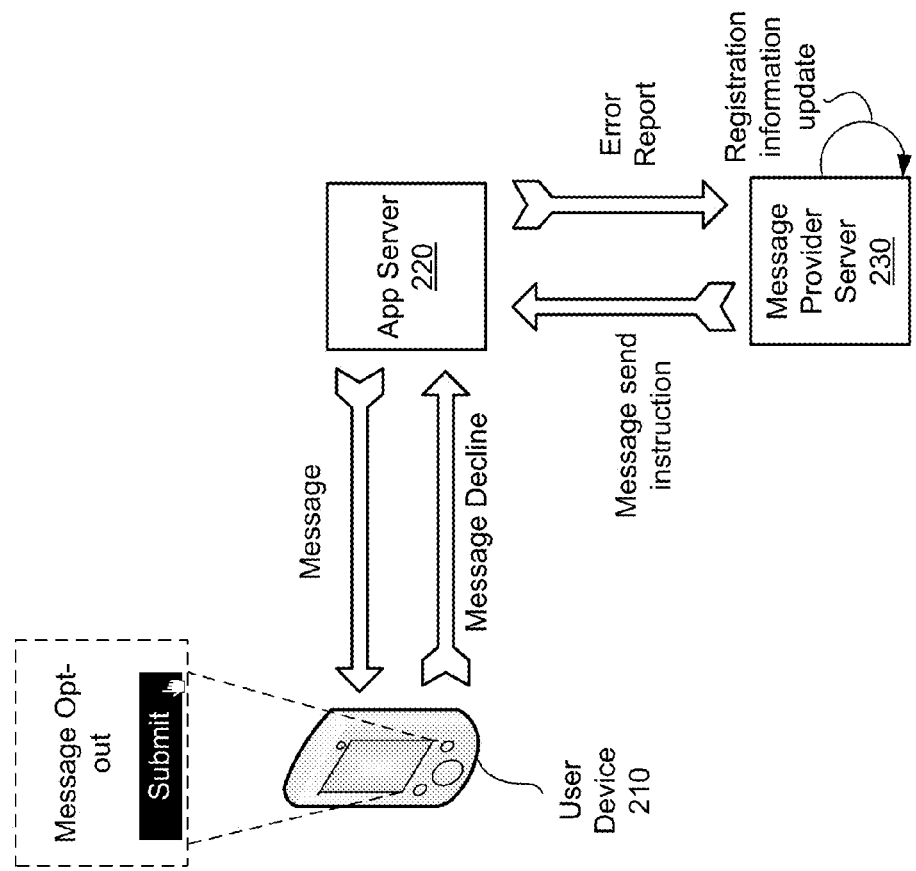

FIGS. 7A-7B illustrate example implementations as described herein. As shown in FIG. 7A, user device 210 may receive an instruction (e.g., from a user of user device 210 via a user interface of an application) to register to receive messages associated with the application (e.g., to "opt-in" or subscribe to receive the messages). In some implementations, user device 210 may provide a message delivery registration instruction to app server 220 based on receiving the instruction to register user device 210 to receive the messages. In some implementations, app server 220 may provide a token to user device 210 based on providing the message delivery registration instruction. In some implementations, user device 210 may provide the token to message provider server 230 to direct message provider server 230 to register user device 210 to receive messages associated with the application. In some implementations (e.g., based on receiving the token from user device 210), message provider server 230 may store information in device registration field 410 to indicate that user device 210 is to receive the messages.

In some implementations, message provider server 230 may provide a message send instruction to app server 220. In some implementations, app server 220 may store information regarding the message send instruction in a message queue. As described above, the message send instruction may include a list of tokens corresponding to user devices 210 to which messages are to be provided. In FIG. 7A, assume that the message send instruction includes the token provided by user device 210. Further, assume that the message send instruction is associated with a content delivery application and includes a message advertising promotional pricing for content delivery (e.g., the message "Free Video, Today Only!"). Given these assumptions, app server 220 may deliver the message (e.g., as a push notification) and user device 210 may display the message as shown in FIG. 7A. In some implementations, user device 210 may display the message in some other format than what is shown. As a result, user device 210 may receive the message as a "push" notification while the application, associated with the message, is in a background state to preserve battery power on user device 210. Further, user device 210 may display the message without user interaction and without the user needing to open the application, provide login information, or interact with user device 210 in some other manner to receive the message.

In some implementations, the user may later unsubscribe or "opt-out" of receiving the messages. Referring to FIG. 7B, user device 210 may receive an instruction to unsubscribe from receiving the messages (e.g., via a user interface associated with the application). In some implementations, user device 210 may provide a message decline indication to app server 220 when receiving a message after user device 210 has unsubscribed. Additionally, or alternatively, user device 210 may provide the message decline indication when the application has been uninstalled from user device 210. In some implementations, app server 220 may store information identifying that the message was undeliverable (e.g., in error report field 430), and may provide an error report, identifying undeliverable messages, to message provider server 230. In some implementations, message provider server 230 may update registration information stored by device registration field 410 based on information included in the error report. For example, message provider server 230 may remove information indicating that user device 210 is to receive messages such that subsequent messages are not provided to user device 210.

While particular examples are shown in FIGS. 7A-7B, the above descriptions merely example implementations. In practice, other examples are possible from what is described above with respect to FIGS. 7A-7B. For example, user device 210 may receive other messages for other applications, such as notifications relating to public emergencies, potentially unauthorized transactions from a user's financial account, data gathered by a sensor device (e.g., a sensor that detects the occurrence of an event, such as a facility intrusion and/or sensor that detects that a measurement has exceeded or dropped below a threshold), a current event (e.g., a sporting event, etc.), and/or some other notification.

As described above, message provider server 230 may receive registration information identifying user devices 210 that are to receive messages associated with a particular application (e.g. messages in the form of "push" notifications that are provided to user device 210 without user device 210 requesting the messages and while the particular application is running in the background of user device 210). In some implementations, the message provider server 230 may receive an error report that identifies user devices 210 that are no longer to receive the messages. In some implementations, message provider server 230 may receive the error report and may update/maintain registration information that identifies particular user devices 210 that are no longer to receive the messages (e.g., when a user unsubscribes from receiving the messages and/or when an application, associated with the messages, has been uninstalled). As a result, message provider server 230 may avoid providing messages that may go undelivered (e.g., when the application has been uninstalled or when a user has unsubscribed from receiving the messages).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
   receiving, by a first server, a first instruction from a user device,
      the first instruction including a token and a request to register the user device to receive a message associated with a particular application;
   updating, by the first server, registration information to indicate that the user device is to receive the message, associated with the particular application, based on receiving the first instruction;
   providing, by the first server, a second instruction to a second server to cause the second server to provide the message to the user device on behalf of the first server,
      the second instruction including information regarding the message, the token, and an instruction to provide the message to the user device associated with the token;
   receiving, by the first server and from the second server, a report indicating that the message was not delivered to the user device; and
   updating, by the first server, the registration information to indicate that the user device is no longer to receive the message based on receiving the report.

2. The method of claim 1, where the message corresponds to a notification that is pushed to the user device when the particular application is running in a background state of the user device.

3. The method of claim 1, where receiving the report is based on the user device receiving an instruction to unsubscribe from receiving the message or based on the user device uninstalling the particular application.

4. The method of claim 1, further comprising:
   authenticating the token based on receiving the first instruction,
   where updating the registration information to indicate that the user device is to receive the message is based on authenticating the token.

5. The method of claim 1, further comprising:
   requesting the report from the second server,
   where receiving the report is based on requesting the report.

6. The method of claim 1, where the second server provides the report independently of receiving a request for the report.

7. The method of claim 1, where the first server and the second server are associated with different parties.

8. The method of claim 1, where the message includes a promotion for a product or service, a notification relating to a public emergency, a notification relating to unauthorized transactions from a user's account, a notification relating to data gathered by a sensor device, a notification relating to a current event, or a notification relating to a gaming application.

9. A system comprising:
   a first server:
      receive a first instruction from a user device,
         the first instruction including a token and a request to register the user device to receive a message associated with a particular application;
      update registration information to indicate that the user device is to receive the message, associated with the particular application, based on receiving the first instruction;
      provide a second instruction to a second server to cause the second server to provide the message to the user device on behalf of the first server,
         the second instruction including information regarding the message, the token, and an instruction to provide the message to the user device associated with the token;
      receive, from the second server, a report indicating that the message was not delivered to the user device based on the user device receiving an instruction to unsubscribe from receiving the message or based on the user device uninstalling the particular application; and
      update the registration information to indicate that the user device is no longer to receive the message based on receiving the report.

10. The system of claim 9, where the message corresponds to a notification that is pushed to the user device when the particular application is running in a background state of the user device.

11. The system of claim 9, where the first server is further to:
    authenticate the token based on receiving the first instruction,
    where when updating the registration information to indicate that the user device is to receive the message, the first server is further to update the registration information based on authenticating the token.

12. The system of claim 9, where the first server is further to:
request the report from the second server,
where when receiving the report, the first server is further to receive the report based on requesting the report.

13. The system of claim 9, where the second server provides the report independently of receiving a request for the report.

14. The system of claim 9, where the first server and the second server are associated with different parties.

15. The system of claim 9, where the message includes a promotion for a product or service, a notification relating to a public emergency, a notification relating to unauthorized transactions from a user's financial account, a notification relating to data gathered by a sensor device, a notification relating to a current event, or a notification relating to a gaming application.

16. A computer-readable medium for storing instructions, the instructions comprising:
a plurality of instructions which, when executed by one or more processors associated with a first server, cause the one or more processors to:
receive a first instruction from a user device,
the first instruction including a token and a request to register the user device to receive a message associated with a particular application;
update registration information to indicate that the user device is to receive the message, associated with the particular application, based on receiving the first instruction;
provide a second instruction to a second server to cause the second server to provide the message to the user device on behalf of the first server,
the second instruction including information regarding the message, the token, and an instruction to provide the message to the user device associated with the token;
receive, from the second server, a report indicating that the message was not delivered to the user device; and
update the registration information to indicate that the user device is no longer to receive messages, associated with the particular application, based on receiving the report.

17. The computer-readable medium of claim 16, where the message corresponds to a notification that is pushed to the user device when the particular application is running in a background state on the user device.

18. The computer-readable medium of claim 16, where the report indicating that the message was not delivered to the user device corresponds to the user device receiving an instruction to unsubscribe from receiving the message or the user device uninstalling the particular application.

19. The computer-readable medium of claim 16, where the first server and the second server are associated with different parties.

20. The computer-readable medium of claim 16, where the message includes a promotion for a product or service, a notification relating to a public emergency, a notification relating to unauthorized transactions from a user's account, a notification relating to data gathered by a sensor device, a notification relating to a current event, or a notification relating to a gaming application.

* * * * *